United States Patent
Chapman, III

(10) Patent No.: US 9,536,083 B2
(45) Date of Patent: Jan. 3, 2017

(54) SECURING DATA ON UNTRUSTED DEVICES

(71) Applicant: Senteon LLC, Winston-Salem, NC (US)

(72) Inventor: Robert Scott Chapman, III, Lewisville, NC (US)

(73) Assignee: Senteon LLC, Winston-Salem, NC (US)

( * ) Notice: Subject to any disclaimer, the term of this patent is extended or adjusted under 35 U.S.C. 154(b) by 0 days.

(21) Appl. No.: 14/724,495

(22) Filed: May 28, 2015

(65) Prior Publication Data

US 2016/0196424 A1 Jul. 7, 2016

Related U.S. Application Data

(63) Continuation of application No. 14/588,779, filed on Jan. 2, 2015.

(51) Int. Cl.
| | |
|---|---|
| G06F 21/00 | (2013.01) |
| G06F 21/53 | (2013.01) |
| G06F 21/60 | (2013.01) |
| G06F 9/455 | (2006.01) |
| G06F 21/62 | (2013.01) |

(52) U.S. Cl.
CPC ........... G06F 21/53 (2013.01); G06F 9/45558 (2013.01); G06F 21/604 (2013.01); G06F 21/62 (2013.01); G06F 21/6218 (2013.01); G06F 2009/45587 (2013.01); G06F 2221/032 (2013.01); G06F 2221/2149 (2013.01)

(58) Field of Classification Search
CPC ...... G06F 21/10; G06F 21/62; G06F 21/6209; G06F 2221/2147; G06F 2221/2101; G06F 2221/2141

See application file for complete search history.

(56) References Cited

U.S. PATENT DOCUMENTS

| | | |
|---|---|---|
| 5,857,201 A | 1/1999 | Wright, Jr. et al. |
| 5,961,590 A | 10/1999 | Mendez et al. |
| 5,968,131 A | 10/1999 | Mendez et al. |
| 6,023,708 A | 2/2000 | Mendez et al. |
| 6,085,192 A | 7/2000 | Mendez et al. |
| 6,151,606 A | 11/2000 | Mendez |
| 6,324,542 B1 | 11/2001 | Wright, Jr. et al. |
| 6,708,221 B1 | 3/2004 | Mendez et al. |
| 6,970,954 B1 | 11/2005 | Guy et al. |
| 7,039,679 B2 | 5/2006 | Mendez et al. |

(Continued)

FOREIGN PATENT DOCUMENTS

EP    1 926 037    5/2008

OTHER PUBLICATIONS

Corporate and Personal Data in Harmony, Separate.ME PowerPoint Presentation, Mar. 2013, 9 pages.

(Continued)

*Primary Examiner* — Amir Mehrmanesh
(74) *Attorney, Agent, or Firm* — Kilpatrick Townsend & Stockton LLP

(57) ABSTRACT

One example method for securing data on untrusted devices includes the steps of identifying, by a first process, a command in a command queue, the command from a second process and comprising an action on secure data; determining whether the command is permitted based on the action and a user credential; and responsive to determining the command is not permitted, removing, by the first process, the command from the command queue.

16 Claims, 7 Drawing Sheets

(56) References Cited

U.S. PATENT DOCUMENTS

| | | | |
|---|---|---|---|
| 7,702,322 B1 | 4/2010 | Maurya et al. | |
| 7,970,386 B2 | 6/2011 | Bhat et al. | |
| 8,012,219 B2 | 9/2011 | Mendez et al. | |
| 8,266,177 B1 | 9/2012 | Seymour et al. | |
| 8,627,490 B2 | 1/2014 | Lim | |
| 2004/0117310 A1* | 6/2004 | Mendez et al. | 705/50 |
| 2005/0091534 A1 | 4/2005 | Nave et al. | |
| 2009/0094676 A1 | 4/2009 | Burugula et al. | |
| 2009/0100060 A1 | 4/2009 | Livnat et al. | |
| 2009/0100529 A1 | 4/2009 | Livnat et al. | |
| 2010/0100972 A1* | 4/2010 | Lemieux | G06F 21/57 726/34 |
| 2010/0212010 A1 | 8/2010 | Stringer et al. | |
| 2010/0275154 A1 | 10/2010 | Livnat | |
| 2012/0017271 A1* | 1/2012 | Smith et al. | 726/19 |
| 2012/0226823 A1 | 9/2012 | Livnat et al. | |
| 2013/0326513 A1 | 12/2013 | Shlomai et al. | |
| 2014/0047011 A1 | 2/2014 | Lahav et al. | |
| 2014/0337628 A1* | 11/2014 | Amato | 713/171 |

OTHER PUBLICATIONS

Patent Cooperation Treaty, International Search Report and Written Opinion, International Application No. PCT/US2015/061097 dated Jan. 29, 2016.

\* cited by examiner

US 9,536,083 B2

SECURING DATA ON UNTRUSTED DEVICES

CROSS-REFERENCE TO RELATED APPLICATIONS

This application is a continuation of U.S. patent application Ser. No. 14/588,779, filed Jan. 2, 2015, entitled "Securing Data on Untrusted Devices," the entirety of which is hereby incorporated by reference.

FIELD

The present disclosure generally relates to data security and more specifically relates to securing data on untrusted devices.

BACKGROUND

Portable electronic devices, such as laptops, tablets, and smartphones, are increasingly used in settings in which sensitive information may be stored on the device. For example, a user may send and receive corporate email on their smartphone or may access, edit, and save internal corporate documents on a tablet device, such as via a remote network connection. In addition, it is becoming increasingly common for users to supply their own devices for use at work under policies commonly referred to as "bring your device" or BYOD policies. However, devices used under such BYOD policies present security risks for information technology ("IT") departments, who traditionally provided corporate devices to users with particular security features enabled.

SUMMARY

Various examples are described for securing data on untrusted devices. One example method includes the steps of identifying a command from a software application to access secure data; determining whether the command is permitted based on the software application and a user credential; and responsive to determining the command is not permitted, removing the command from a command queue.

One example device comprises a non-transitory computer-readable medium; a processor in communication with the non-transitory computer readable medium, the processor configured to: monitor, by a first process, a command queue to identify commands from other processes, at least one of the commands indicating an action on secure data; access one or more access rules to determine whether the at least one command is permitted; and responsive to a determination the command is not permitted, remove the command from the command queue.

On example non-transitory computer-readable medium comprises program code, the program code comprising monitoring software executable by a processor, the monitoring software configured to monitor a command queue to identify commands from other processes; identify a command indicating an action on secure data; transmit a request to determine whether the command is permitted; and responsive to a response to the request indicating that the command is not permitted, remove the command from the command queue.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
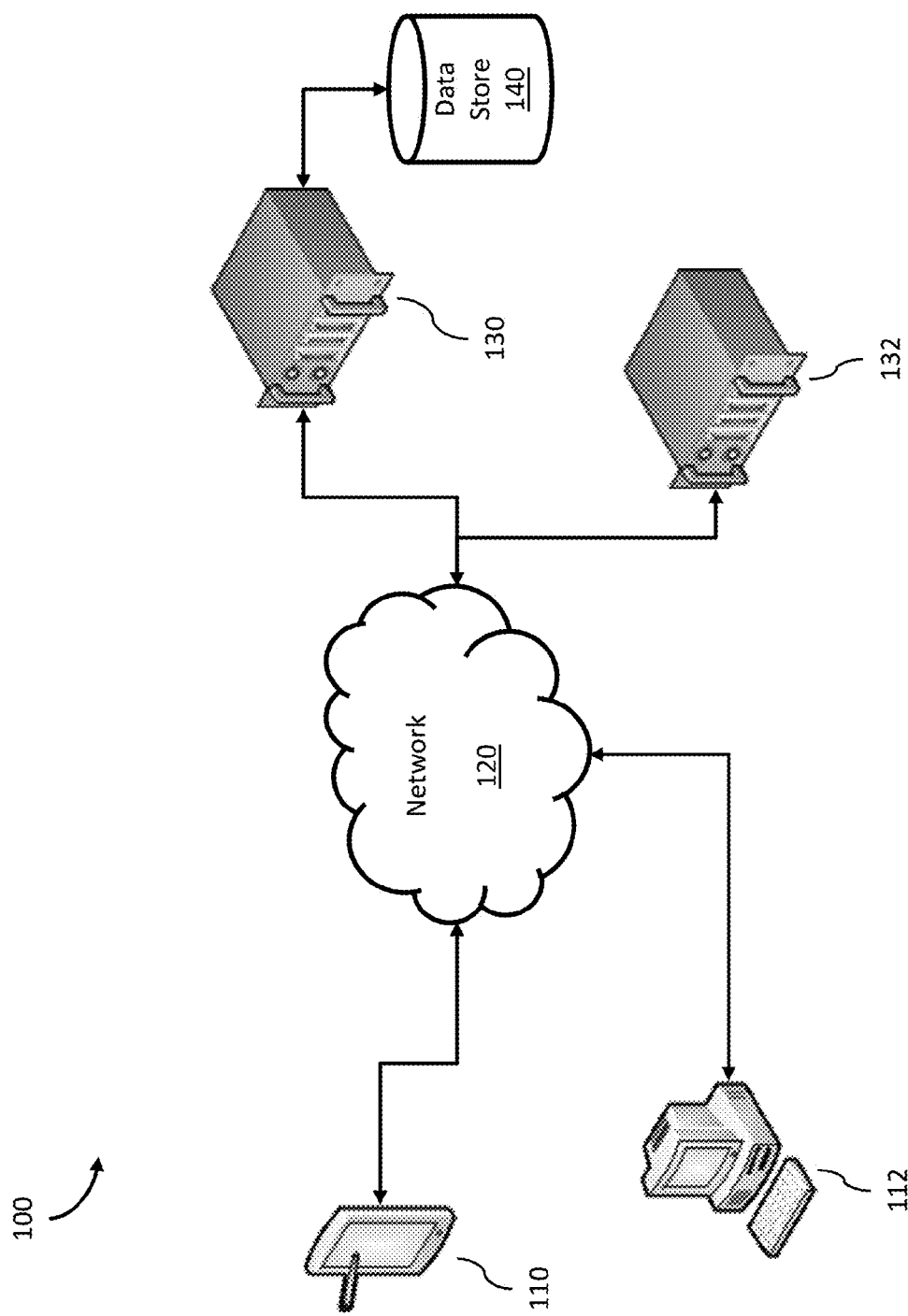
FIG. 1 shows an example system for securing data on untrusted devices.

Examples are described herein in the context of securing data on untrusted devices. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative Method for Securing Data on Untrusted Devices

In one illustrative example of a method for securing data on untrusted devices, a user uses a tablet computer to access a word processing document stored on a remote corporate document server. The tablet downloads the document and stores it on a secure partition on a flash memory device within the tablet. The user then executes a word processing application on the tablet, uses a menu to execute a file "open" command, and uses a file navigation dialog window to navigate to the downloaded document within the secure partition. After locating the document, the user clicks an "OK" button to cause the application to open the document.

When the user clicks "OK," the application issues a command to the operating system ("OS") via an application programming interface ("API") that includes a file pathname and filename for the document to be opened. For example, the application executes an operating system API command called OS.FileOpen and provides as a parameter the pathname and filename for the file, such as "z:\secure\docs\businessplan.doc." The API command causes the OS to generate an entry in a command queue to be executed to open the file. In this case, the OS is a multitasking OS and thus receives commands from a wide variety of different threads and processes, including from aspects of the OS itself. Thus, the OS queues received commands within a command queue for later execution. In this case, the OS queues the received file "open" command and the pathname and filename in the command queue for execution.

However, in this example, the user's tablet is executing a software application that monitors commands attempted to be executed on data located within the secure partition. The monitoring software monitors events within the OS's command queue to identify any commands that include pathnames within the secure partition. In this example, the monitoring software checks for events within the OS's command queue that have a target pathname that includes "z:\secure." Thus, when the OS generates a new command for the queue for the "open" command with the pathname "z:\secure\docs," the monitoring software identifies the corresponding event and determines whether the corresponding command, "open" in this example, is a permitted command for the software application for this file and for the user for this file. In this example, the user does not have permission to access the file, and so the monitoring software deletes the corresponding event from the command queue before it is executed. In addition, the monitoring software generates and displays a notification to the user that the attempted command was unauthorized, and generates and stores an entry in the monitoring software's audit log indicating the attempted "open" command, the pathname and filename of the document, the user who attempted to perform the action, and the results of the attempt, which is that the command was not permitted to execute.

The user realizes that she has selected the wrong document, and downloads a second document, "doc2.doc," to the secure partition. The user then attempts to open the second document using the word processing application. The word processing application again calls the OS's API and passes the pathname and filename, "z:\secure\docs\doc2.doc," to the "open" command. The OS generates an entry in its command queue to open the identified file. Again the monitoring software identifies the entry based on the pathname for the secure partition, "z:\secure," and determines whether the software application and the user are permitted to open this document. In this case, the user is authorized to open the file with the word processing application, and so the monitoring software does not delete the entry from the command queue, and thus allows the OS to execute the command. The monitoring software then obtains a process identifier ("process ID") for the instance of the software application that opens the document and stores, in a data structure, a record including the process ID, information about the document (e.g., the filename and path), and a reference to access rules associated with document and the user. In addition, the monitoring software generates an entry in its audit log indicating the successful opening of the file that includes the user's name, the filename, and the command that was executed, "open" in this case. The software application then opens the document and presents it to the user.

The user then decides that she would like to save the document to a removable flash memory device inserted into the tablet, so she selects the command "save as" from the menu system within the word processing application and selects the removable flash memory device as the destination for the "save as" command. The word processing application calls the OS.FileSaveAs API function and provides the destination pathname and filename for the document, and the OS generates an entry in the command queue for the "save as" command.

In this case, the monitoring software detects the attempted "save as" of the document by identifying the process ID of the instance of the software application in the command queue and analyzing the command corresponding to the process ID. In this case, the monitoring software analyzes the data structure to identify the corresponding access rules for the user and the document. The monitoring software then accesses the access rules to determine whether the user has sufficient permission to perform the "save as" operation to a location outside of the secure location. In this case, the monitoring software determines that the user does not have sufficient permission, and deletes the entry corresponding to the "save as" command from the command queue. As before, the monitoring software generates and displays a notification to the user that the attempted operation is not allowed, and generates an entry in its audit log indicating the attempted command, the pathname and filename, and the user's name.

In this illustrative example, the monitoring software is capable of monitoring for other types of commands as well that might allow either for unauthorized access to a document, or to the unauthorized movement of secured data out of the secured partition. For example the monitoring software is capable of detecting and preventing file-level operations, such as "save," "save as," "copy," "move," "share," and "rename," content-level operations, such as "print," "cut," "copy," "paste," other application-specific operations, such as email operations (e.g., attaching a secure file to an email), as well as other operations that may be executed by other applications or the operating system, such as screenshot or screen recording functionality, or change file permissions to reflect "read only," "read/write," or other types of permissions. Examples of securing data on untrusted devices may include data security on untrusted devices without the need for providing application "wrappers" that affect the operation of individual software applications. Instead, various examples may provide effectively transparent security for secured data to both users, as well as the software applications and operating system on the device.

The illustrative example above discussed the use of different software applications; however, other portions of this detailed descriptions may reference the general term "process." Software applications may execute as processes on a computing system. For example, when a word processing software application is launched, the executing word processing software application may be referred to as a process. In such an example, for clarity, the processes may be referred to as a "first" process and a "second" process. The labels "first" and "second (and "third," etc.) are not intended to indicate a sequence, but rather simply to distinguish different processes from each other. For example, if multiple different software applications are executing substantially simultaneously on a computing system, such as within the context of a multi-tasking operating system, each software application may be a separate process and may be referred to using such labels. For example, the monitoring software discussed above executes as a process separate and distinct from the word processing software application process, thus the monitoring software may also be referred to as a "first process" and the word processing software application as a "second process." Further, some processes may include one or more execution "threads" that may operate partially or entirely independently of each other. Such threads are typically part of a single process, but may represent different tasks performed by the process. Reference to the terms process and threads throughout may generally refer to these concepts or to concepts generally understood to those of skill in the art.

Other examples of securing data on untrusted devices are provided in the detailed description below.

Referring now to FIG. 1, FIG. 1 shows an example system 100 for securing data on untrusted devices. The example system 100 includes a portable computing device 110 and a desktop computer 112 in communication with a document server 130 and a management server 132 via a network 120. The document server 130 is in communication with a data store 140 and is configured to maintain files available to the computing device 110 and the desktop computer 112. The management server 132 is configured to establish and provide access policies to the devices 110, 112. The network 120 may be any suitable network, such as the Internet, a cloud-based network, an intranet, local area network, wireless local area network, wide area network, microwave network, satellite network, Integrated Services Digital Network, cellular network, and combinations of these or other types of networks.

Each of the computing device 110 and the desktop computer 112 have installed and execute monitoring software configured to secure data on the respective device 110, 112. The monitoring software communicates with and receives configuration parameters and access credentials for accessing secured data from the server 130. In addition, each of the devices 110, 112 is configured with a storage location that has been established for storing secured data. In this example system 100, each of the devices 110, 112 has a computer-readable medium with a file system partition that has been established to store secure data. The file system partition is configured such that it is separately established in a partition table for the computer-readable medium and may be independently mounted and unmounted from file system. In some examples, the secure partition may reside on a different physical medium.

The server 130 is configured to manage a document repository, such as a corporate document system. The server 130 enables authorized users to log in to the document repository and access one or more documents stored within the document repository. Documents within the document repository are stored in the data store 140 and may be accessed by the server 130 in response to requests received from devices, such as the computing device 110 or the desktop computer 112.

The management server 132 maintains security policy information for authorized users of the document repository. For example, the management server 132 maintains, for each user or for one or more groups of users, configuration settings indicating which files the user may access and which operations the user is permitted to take with respect to each file or group of files. The management server 132 audits security policy information on each device when it attempts to connect to the document repository, and the management server 132 updates the security policy information if needed. In addition, the management server 132 generates security key information for the secure storage location on the devices 110, 112, which will be described in greater detail below.

Figure 2:
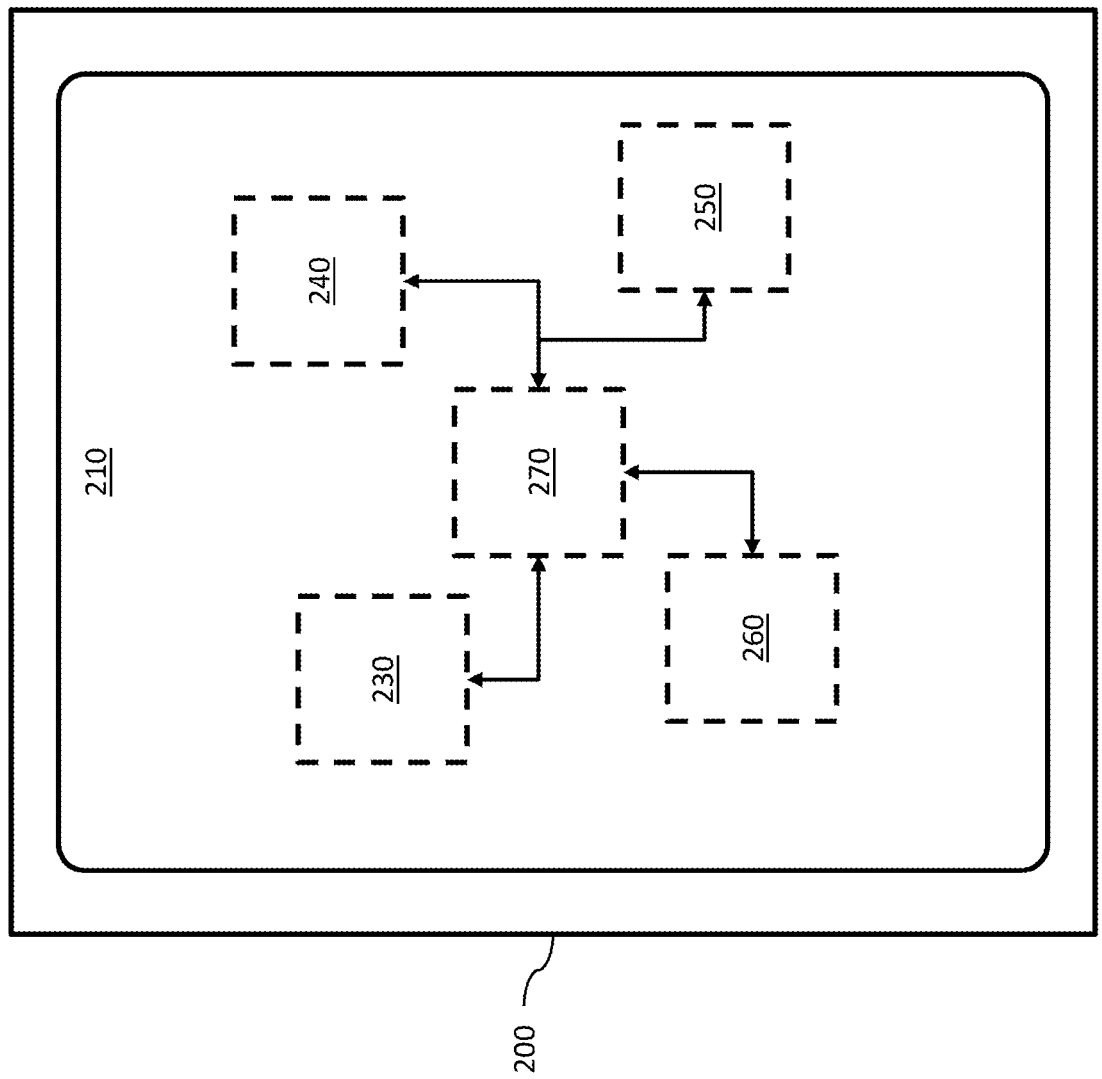
FIG. 2 shows an example computing device for securing data on untrusted devices.

Referring now to FIG. 2, FIG. 2 shows an example computing device 200 for securing data on untrusted devices. The example computing device 200 shown in FIG. 2 is a tablet device, but in some examples, the computing device 200 may be a smartphone, a desktop computer, a laptop computer or other suitable computing device. The example computing device 200 comprises a touch-sensitive display 210, an electronic processor 230, a memory 240, a storage medium 250, a network interface 260, and a communications bus 270. The processor 230 is configured to access the memory 240 and to execute program code stored within the memory 240, and to read and write data to the memory 240. The processor 230 is also configured to access the storage medium 250 to load data into the memory 240, or to store data from memory to the storage medium 250. The processor 230 is further configured to use the network interface 260 to access one or more communications networks, such as the network 120 shown in FIG. 1, and to communicate with other devices connected to the network(s).

The storage medium 250 is configured to maintain one or more file systems and one or more data files. Examples of suitable types of storage media are described in greater detail later in this detailed description. In this example, however, the storage medium 250 comprises a flash memory device that has been configured to have two file system partitions. One partition (the "primary partition") is configured to store the device's 200 operating system and other data files, and the second partition (the "secure partition") is configured to store data files received from a document repository.

In this example, the device 200 initially boots and mounts the primary partition as a part of the operating system's file system. In addition, while the device 200 boots, it executes monitoring software, which will be described in greater detail below. Once the device 200 booted, it operates using the primary partition, which stores the operating system, various software applications, such as word processing, spreadsheet, web browsing, and other applications, and various data files, including user data files. In this example, the monitoring software is configured to mount and unmount the secure partition.

It should be noted that while the term "mount" is used in this example and elsewhere in this detailed description, it is not intended to reference the use of the "mount" utility available within certain operating systems. Instead, the term "mount" and the related term "unmount" are used throughout this specification as generic terms for the process of attaching or detaching a file system. The terms "mount," "attach," "unmount," and "detach," may be used interchangeably to refer to this process.

Figure 3:
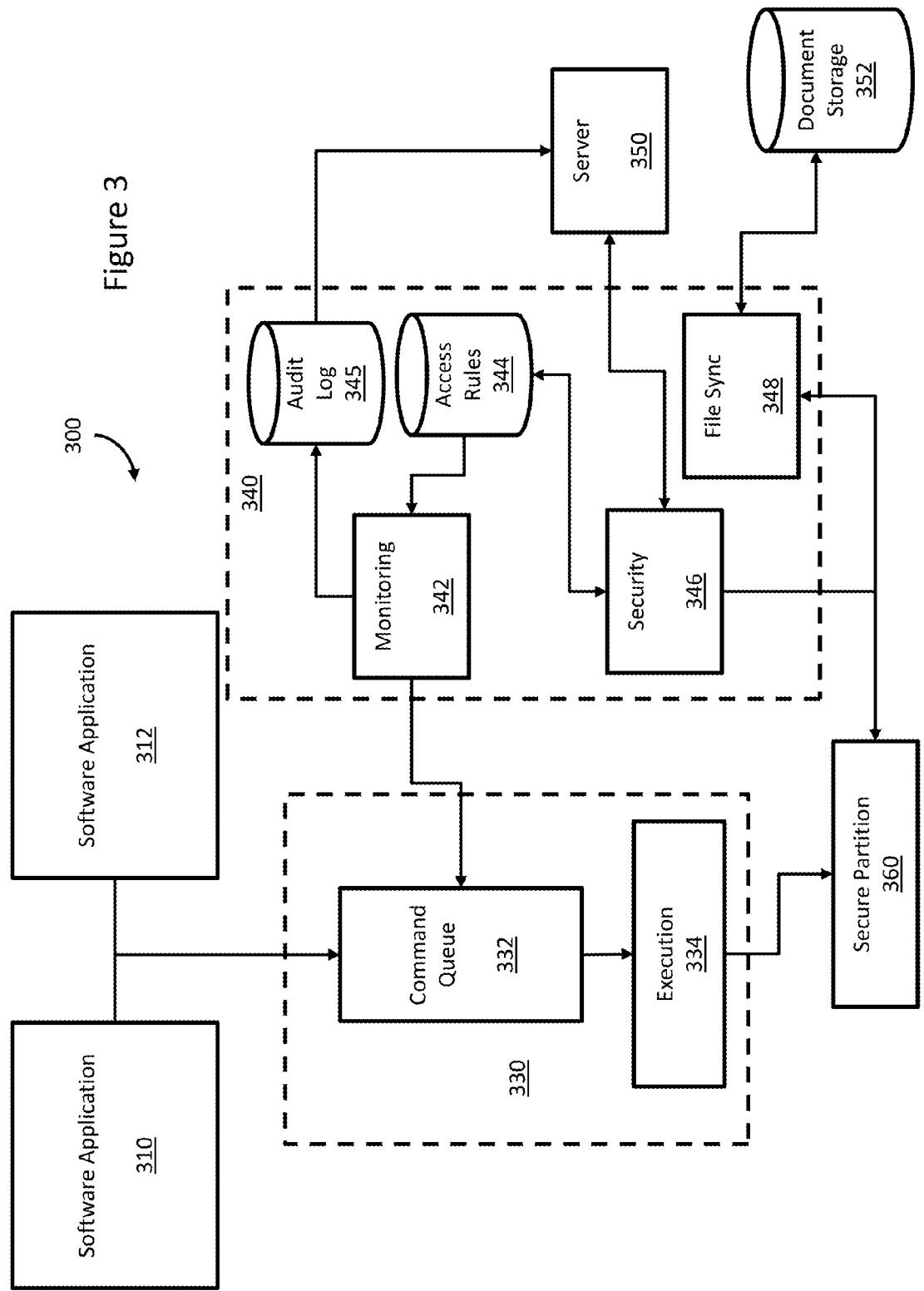
FIG. 3 shows an example system for securing data on untrusted devices.

Referring now to FIG. 3, FIG. 3 shows an example architectural diagram for a system 300 for securing data on untrusted devices. In this example, the diagram represents a configuration of an example computing device, such as the computing device 200 shown in FIG. 2. This example is described with respect to the computing device 200 of FIG. 2, but any suitable computing device may be used. In this example, software applications 310, 312 seek to access and manipulate data files stored on a secure partition 335.

The system 300 includes a subsystem 340 for securing data on untrusted devices executing within a computing device. The system 300 includes the subsystem 340 as well as one or more software applications 310, 312, an operating system 330, and a secure partition 360. The subsystem 340 includes monitoring software 342, an access rules data store 344, an audit log 345, security software 346, and file sync software 348.

The software applications 310, 312 are configured to be executed by the computing device 200 and to access data files stored on the computing device 200. For example, if software application 310 is a word processing application, the software application 310 enables a user to create, modify, and store documents on the computing device. To do so, the software application 310 interacts with the operating system 330, such as to call OS API functions to create, modify, and store data files on a storage medium. When the software application 310 calls an OS API function, the function inserts a command into the OS's command queue 332 for later execution by the operating system, shown as an "execution" block 334 of the operating system. When the execution block 334 executes a command, it may access a storage medium to manipulate a data file, such as to open a file or to save changes to a file.

The subsystem 340 operates alongside the operating system to manage access to the secure partition 360. In this example, and as discussed above, when the computing device is initially powered on or otherwise is booted, the computing device 200 launches the operating system 330 and also launches the subsystem 340, including the monitoring software 342 and the security software 346. In this example, the security software 346 is configured to create the secure partition 360 if it does not already exist. In one example, the security software 346 will generate a new entry in a partition table for the storage device for the secure partition 360, and generate an encrypted partition.

If the secure partition 360 does already exist, the security software will access and mount the secure partition 360 such that it is accessible to the operating system 330.

While discussions of this example has referenced an operating system, other examples may employ application environments other than operating systems. One example uses an application server environment executing on top of an underlying operating system. In such an example, the monitoring software 342 may instead monitor a command queue for the application server environment rather than the operating system. In some examples, the monitoring software 342 may monitor a command queue for the application server environment and a command queue for the operating system.

Still further layering of execution environments or parallel execution of execution environments are contemplated, such as one or more virtual machines executing on a computing system. In one such example, each virtual machine may execute a different operating system and monitoring software. In some examples, monitoring software may monitor each of the virtual machines interaction with underlying operating system software.

In this example, the secure partition 360 is a dedicated partition established on the storage medium 250 within the computing device 200. The secure partition 360 was initially established on the storage medium using a disk partitioning facility, e.g., "fdisk." In addition, the security system 346 is configured to encrypt the secure partition using key-based encryption, such as the Advanced Encryption Standard ("AES") or Twofish mechanism. In some examples, multiple encryption mechanisms may be employed in a cascade, such as AES, Twofish, and Serpent mechanisms applied in succession to the same data. Thus, when data is stored on the secure partition 360, it is stored in an encrypted format. Later, when a software application requests access to an encrypted file, a decrypted version of the file is provided to the software application.

The security software 346 is configured to regulate access to the encrypted data on the secured partition 360 and to maintain and update rules within the access rules data store 344. In this example, after the device 200 has booted, the user is asked to provide her credentials to the security software 346, such as a user name and password. In some examples, other types of authentication may be used, such as two-factor authentication using a generated access code. After the user has provided acceptable credentials, the security software 346 mounts the secure partition 360 and then attempts to access a remote server 350 to obtain encryption keys to access the data on the secure partition 360. For example, the computing device 200 may be a laptop used by an employee of a company to access files within the company's document repository.

The security software 346 then attempts to access the company's server 350 to obtain an encryption key. In this example, when the security software 346 connects with the company's server 350, the security software 346 provides the user's access credential to the server 350. The server 350 then accesses or generates an encryption key to be used by the security software 346. In one example, the server 350 generates a 504-bit key, hashes the key, and transmits the hashed key to the computing device 200. If the security software 346 is unable to access the server 350, it may determine whether it has an existing, valid encryption key. For example, an encryption key may be usable for a certain time period, such as 48 hours, before expiring, at which time, the encryption key is disabled by the security software 346.

In this example, the security software 346 is configured to maintain encryption keys for up to 48 hours before disabling them. But in addition, the security software is also configured to request a new key from the server 350 every 4 hours. When a new key is obtained, the secure partition is re-encrypted using the new key, which consequently invalidates the old key. In addition to re-starting the 48 period, an effect of using a new key every four hours is that it may help re-secure a device that has had its previous key compromised by an unauthorized entity. But as long as the computing device 200 remains in communication with the server 350, and as long as an authorized user is logged into the security software, it will have indefinite access to data files (authorized to the user) stored in the secure partition 360. However, if the computing device 200 becomes disconnected from the server 350, the user may continue to access the secure partition for up to 48 hours before losing access to the data files. It should be apparent that these time periods are provided by way of example only and different key refresh and key expiration time periods may be established. In some examples, different types of files may have different key refresh or key expiration periods. For example, highly-sensitive documents may have a shorter key expiration period than less-sensitive documents. And in some examples, each document may have its own associated key refresh or expiration time period.

In addition, the security software 346 checks for any updated access rules for the user and, if any are found, it downloads the access rules and stores them in the access rules data store 344. Access rules may include user-specific, device-specific, file-specific, application-specific, or other types of rules that may be defined to regulate access to data files. For example, a user may only have access to certain files available within a company's file repository, thus a set of user rules may include information indicating whether a user has permission to open or otherwise access a data file stored in the secure partition 360. Thus, when a user attempts to open the data file, the monitoring software 342 checks the access rules 344, identifies the rule associated with the user and the data file, and prevents the file "open" command from being executed by deleting the command from the command queue. In this example, the monitoring software 342 also adds an entry in the audit log 345 to indicate the command that was disallowed and other relevant information, such as the user who attempted the command, the time and date of the attempt, the file name, or the path. The audit log 345 may be transmitted to the server 350, or may be requested by the server 350. For example, the audit log 345 may be transmitted to the server 350 every day. In some examples, the audit log 345 may be stored at the server 350, and the computing device 200 may transmit audit log messages to the server 350 for entry into the log 345.

In some examples, access rules may be stored as records within a data store. For example, a suitable example record for an access rule may include the following information:

| Field | Value |
|---|---|
| Rule ID | 0x01 |
| Device ID | 123e4567-e89b-12d3-a456-426655440000 |
| User ID | company/jsmith |
| Document Name | document.doc |
| Path | /secure/docs |
| Action | Copy – Allowed |

Such an access rule relates to user "jsmith" and the identified file "document.doc" stored within the secure partition ("/secure") in the directory "docs." The rule, in this example, is specific to the "Copy" action, which is allowed for this document and this user. Thus, when the monitoring software detects a "copy" action being attempted by a process ID associated with the "document.doc" file and "jsmith," the system will access the access rules, locate the rule associated with the user, the file, and the action, and determine whether to allow the action according to the rule.

The record above is provided as an illustrative example and is not intended to indicate all variations of such a record (or records) or to be an exhaustive or necessary listing of information to be stored within records according to difference aspects.

One or more records may be obtained from the server 350, or may be created and stored at the computing device 200 based on information obtained from the server 350.

In this example, the subsystem 340 also includes file sync software 348. The file sync software 348 is configured to retrieve one or more data files from, and to push changed or new files to, a document repository (or repositories), shown as document storage 352 in FIG. 3. For example, a company may maintain a corporate document repository that allows users to create new documents and check documents into and out of the repository to edit, print, email, or otherwise use the documents. To enable a user to access documents available in the document repository remotely, the company may provide direct access to the document repository, such as via a virtual private network ("VPN"). However, according to examples of this disclosure, the file sync software 348 may retrieve documents from document storage 352 and store local copies of the documents within the secure partition 360 on the computing device. In addition, the file sync software 348 may push new or modified documents to document storage 352. In some examples, the file sync software 348, or other aspects of the subsystem 340, may also provide check-in/check-out functionality with respect to the document storage 348, which may enable the user to open edit a document without another user simultaneously opening and editing the same document.

The file sync software 348 may obtain one or more sets of documents from document storage 352. The file sync software 348 then analyzes the one or more sets of documents to identify documents that are not present in the secure partition. After identifying any missing documents, the file sync software 348 obtains copies of the missing documents and stores them within the secure partition 360. In some examples, the file sync software 348 also determines whether any documents stored on the secure partition 360 are different than a version stored in document storage 352.

For example, the file sync software 348 may generate and compare hash values of one or more of the documents on the secure partition with a corresponding document in document storage 352. If a hash value for a file on the secure partition differs from the version in document storage 352, the file sync software 348 determines whether to push a copy of the document from the secure partition to document storage 352, or to obtain a copy of the document from document storage 352 and replace the copy on the secure partition 360. To make such a determination, the file sync software 348 may compare the date or time of the most recent modification of the file on the secure partition with the date or time of the most recent modification of the file in document storage 352. The file sync software 348 may then copy the most recently-modified version to the other location (e.g., copy a recently-modified version from the secure partition to document storage). In some examples, as discussed above, the file sync software 348 (or the subsystem 340) may be configured to check-out documents from document storage 352. When the document is later checked in, the file sync software 348 may then copy the version from the secure partition to the document storage 352 to replace the then-existing copy in document storage 352.

In some examples, however, the subsystem 340 may not be able to check-out documents from document storage 352. Thus, it is possible for a user of the computing device 200 to edit a copy of a document on the secure partition 360 simultaneously with another user editing a copy of the same document in document storage. In such a case, the file sync software 348 may determine that the two versions of the document have "forked" and thus, the file sync software 348 may copy the file from the secure partition 360 to the document storage as a new document in document storage 352. "Forking" simply refers to the generation of two (or more) different documents from the same source document. In some examples, the file sync software 348 or the subsystem 340 may store an indicator that the new "forked" document is related to the original document.

Figure 4:
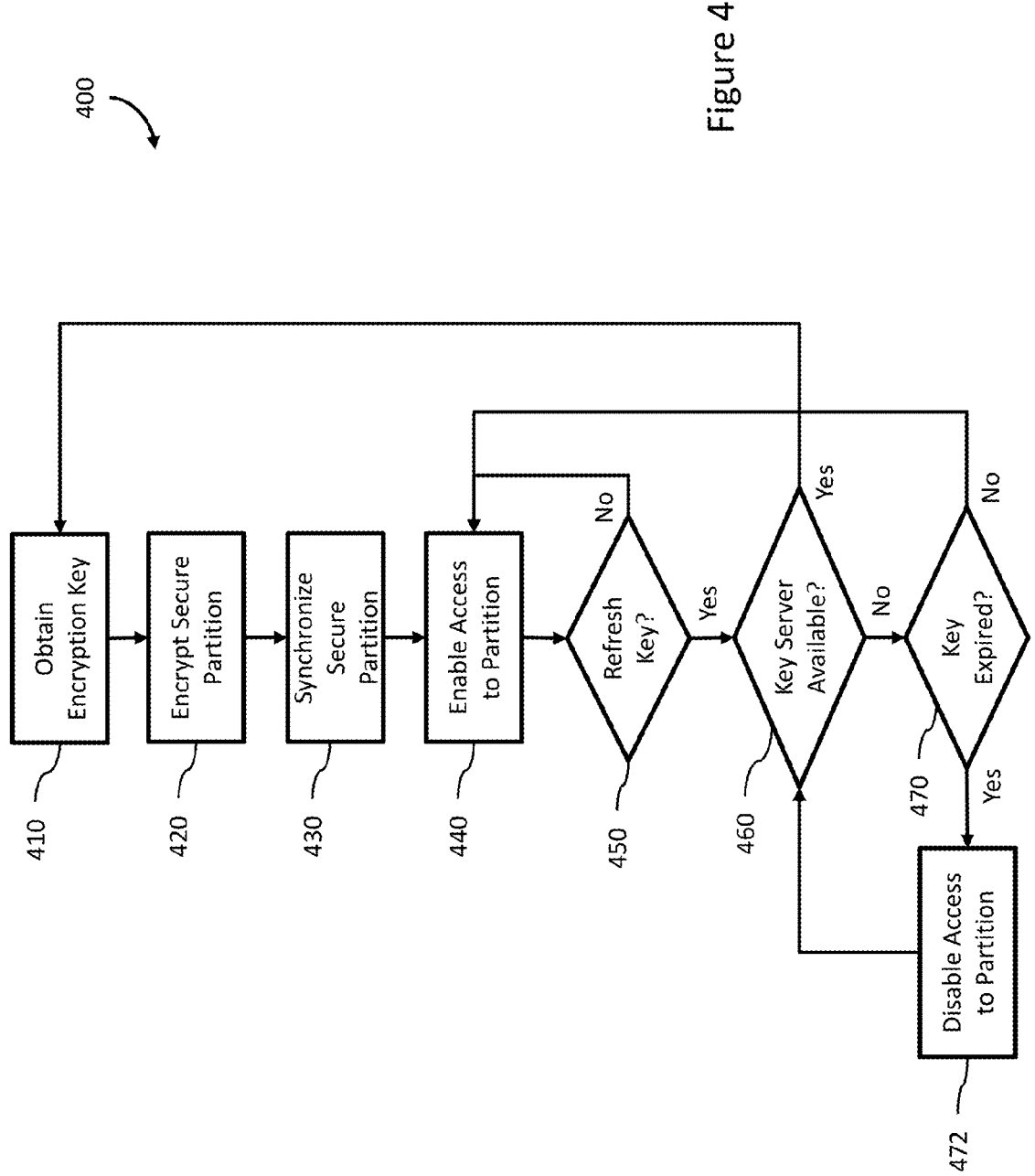
FIGS. 4-5 show example methods for securing data on untrusted devices.

Referring now to FIG. 4, FIG. 4 shows an example method 400 for securing data on untrusted devices. The method 400 of FIG. 4 will be discussed with respect to the computing device 200 shown in FIG. 2 and the example system 300 shown in FIG. 3. However, example methods are not limited to such a computing device 200 or such an example system 300. Rather, any suitable device or system may be employed. In this example, the method 400 begins at block 410.

At block 410, the security software 346 obtains an encryption key for the secure partition 360. If the secured partition does not exist, the security software 346 creates a new partition on the storage medium 250 to be used as the secure partition 360. In some aspects, to obtain the encryption key, the security software 346 accesses records associated with network addresses of known key servers and transmits a request to one or more of the key servers for an encryption key. In some aspects, the security software 346 may send a "heartbeat" or other message to a server, such as server 350, to indicate that the computing device 200 is operating, rather than a specific request for an encryption key. In response to the request, or in response to receiving a different message or data, from the computing device 200, the key server (or other server) generates and transmits an encryption key to the device. In some aspects, the key server also provides configuration information indicating a time-to-live, or expiration date or time, for the encryption key. In some aspects, the computing device 200 may be preconfigured with time-to-live parameters for use with one or more encryption keys or may obtain time-to-live parameters from a user or an administrator.

In some aspects, files associated with multiple users may have their own encryption key that is associated with each of the users and may be refreshed as described above. For example, the security software 348 may maintain encryption keys for each user, and may also maintain encryption keys for one or more aggregations or groups of users. In some examples, such aggregations or groups may be determined dynamically as multiple users obtain access to the same file or files. When a new aggregation or group is established, such as by determining that two or more users may access the same file, the security software 348 may request an encryption key for the aggregation, and, as will be discussed in greater detail below, may separately maintain one or more timers or expiration times for the new key.

In some aspects, the server 350 encrypts the encryption key using a cryptographic hash function, such as SHA-1, SHA-2, or SHA-3, before transmitting the encryption key to the computing device 200.

After obtaining the encryption key, the method 400 proceeds to block 420.

At block 420, the security software 348 encrypts the secure partition using the obtained encryption key. In this example, the security software 348 uses the encryption key to employ a cascading encryption mechanism that includes AES, TwoFish, and Serpent mechanisms and uses the XEX (XOR-encrypt-XOR)-based tweaked-codebook mode with ciphertext stealing ("XTS") method. In other examples, the encryption key may be used with other suitable encryption schemes to encrypt the secure partition. In some examples, the computing device 200 may employ an OS that supports and is configured to use one or more encrypted file systems, such as Microsoft's Encrypting File System. In addition, if the secure partition has not been mounted, the security software 346 may also mount the secure partition to the computing device's file system, or it may defer mounting until a later time.

In some examples, the security software 346 may generate encrypt different portions of the secured partition 360 using different encryption keys. For example, if multiple different users may access the computing device at different times, the security software 346 may encrypt the active user's files using the encryption key, but may not encrypt the other users' files using that key. Thus, each user may have his or her own encryption key (or keys) that may be active at one time, or that may expire independently of each other, and each user's files may be encrypted using the user's own encryption key.

For example, two users may access the computing device 200. The computing device 200 may assign each user to a different subdirectory structure on the secure partition 360 for the user to access files. When the first user logs into the computing device 200, the computing device 200 obtains an encryption key and encrypts the first user's files using the new encryption key, but does not process other files on the secure partition. As the first user works, the encryption key may be periodically refreshed as described above. Later, when the first user logs off, the security software 348 maintains the user's encryption key until it expires. In the meantime, a second user logs in. The computing device 200 obtains a second encryption key and encrypts the second user's files. Again, as the second user works, the encryption key may be periodically refreshed as described above. Later, the second user logs off, and the first user logs back in. The computing device determines whether the encryption key associated with the first user remains valid. If so, it enables access to the user's files on the secure partition 360. If it is not valid, the security software 346 requests a new encryption key and encrypts the user's files using the new encryption key. Different examples may use such an encryption methodology with one or more users.

After the secure partition has been encrypted, the method proceeds to block 430.

At block 430, the file sync software 348 synchronizes files stored on the secure partition with files stored in document storage 352. In this example, the file sync software 348 maintains records indicating files to synchronize between the secure partition 360 and document storage 352. For example, the file sync software 348 may retrieve a listing from document storage 352 of all documents a user has accessed in document storage 352 in the last 30 days (or other preset or user-configurable time period) and add entries to the list for any new documents created by the user on the computing device 200.

To synchronize one or more files between the secure partition 360 and document storage 352, the file sync software 348 may identify one or more files stored on the secure partition 360 that are not stored in document storage 352 and copy one or more of those files to the document storage 352. The file sync software 348 may also identify one or more files stored in document storage 352 that are not resident within the secure partition 360, and obtain copies of one or more of the files from document storage 352 and save them to the secure partition 360. The file sync software 348 may also analyze versions of files stored in both the secure partition 360 and document storage 352 and determine when a different version of a file is stored in each location. The file sync software 348 may then determine which version is more recent and may attempt to overwrite the older version with the newer version of the file. In some examples, the file sync software 348 may not overwrite an older version of a file with a newer version, but may instead maintain and synchronize both versions. For example, if a user of the computing device 200 edits a document in the secure partition 360, the file sync software 348 may copy the edited document to the document storage 352 and indicate that it is to be stored as a new version of the prior document.

In some examples, the file sync software 348 may be configured to only synchronize a portion of the secure partition, such as a single subdirectory or group of subdirectories. For example, each user that employs the computing device 200 may be allocated and assigned a subdirectory in which their synchronized files will be maintained. Thus, the file sync software 348 may only synchronize files for the user that is logged into the computing device 200. Such a feature may reduce the processing and bandwidth requirements for synchronizing the secure partition 360 with document storage 352.

After synchronization of the secure partition has been initiated, the method 400 proceeds to block 440.

At block 440, the security software 348 enables access to the secure partition 360. For example, the security software 348 may mount the secure partition 360 to enable access. In some aspects, the security software 348 may provide a graphical user interface that provides icons or other graphical elements corresponding to one or more files stored within the secure partition 360. In some aspects, the security software 348 may not need to take any affirmative steps to enable access to the secure partition 360 once it has been mounted.

After the security software 348 has enabled access to the secure partition 360, the method 400 proceeds to block 450.

At block 450, the security software 348 determines whether to refresh one or more encryption keys. In this example, the security software 348 identifies one or more time periods associated with an expiration of an encryption key. For example, an encryption key may have two time periods associated with it, a refresh time period, and an expiration time period. The security software 348 determines a start time for the encryption key, which may be based on the time the key was obtained, the time the key was first used, the time when the secure partition was encrypted, or some other time. The security software 348 then determines an elapsed time and compares the elapsed time to the two time periods. If neither time period has elapsed, no refresh is needed, and the method returns to block 440 and the user may continue to access the secure partition 360. If the refresh time period has elapsed or the expiration time period has elapsed, the method 400 proceeds to block 450, which is described in greater detail below. In some cases, the refresh timer may be exceeded, but the secured device is unable to obtain a new encryption key, thus the security software 348 may also check the expiration time. If the expiration time is met, the method also proceeds to block 450.

In some examples, rather than determining the elapsed time during which a key has been active, the security software 348 may establish one or more expiration times for a key. Thus, the security software 348 can check the current time with the expiration time(s) to determine whether the key has expired or needs to be refreshed. For example, the security software 348 may maintain two expiration times for the key. The first expiration time is a refresh time while the second refresh time is an expiration time. When either time is met or exceeded, the method 400 proceeds to block 460. In some examples, the refresh time may be earlier than the expiration time.

In some examples, the security software 348 may only maintain a single timer for an encryption key, and when the timer has elapsed, or has been met, the method 400 proceeds to block 450. Further, in some examples, the security software 348 may maintain multiple encryption keys, such as described above in the example having two users using the same computing device 200. In some such examples, the security software 348 may maintain separate refresh or expiration times or timers for each encryption key, or may maintain a single time/timer for all encryption keys, or a combination of the two. For example, in one example, the security software 348 may maintain individual refresh times for each encryption key, but may maintain a single expiration timer at which time all encryption keys expire.

As discussed above, multiple users may access a computing device 200. In one such example, the security software 348 maintains different encryption keys for each user. When a first user is logged into the computing device, the security software 348 may only attempt to refresh encryption keys associated with the first user, but the security software 348 may still check to determine whether an encryption key associated with a different user may be expired and thus the method 400 may proceed to block 460, even if the active user's encryption key does not need to be refreshed. In one such example, the encryption key for the inactive user(s) may be used only to encrypt a portion of the secured partition, thus, even if the inactive user(s)'s encryption key(s) expire, the active user's encryption key may remain active and allow the active user to continue to access the secure partition.

If the security software 348 determines that an encryption key is to be refreshed, the method 400 proceeds to block 460, otherwise the method 400 returns to block 440.

At block 460, the security software 348 determines whether a key server is available to obtain a new encryption key. In this example, the security software 348 attempts to communicate with the server 350. If the security software 348 is able to communicate with the server 350, the method 400 returns to block 410 where the security software obtains a new encryption key as described above. If the security software 348 is not able to communicate with the server 350, the security software 348 may attempt to communicate with a suitable alternate or backup server. If the security software 348 is able to communicate with such a suitable alternate or backup server, the method 400 returns to block 410 where the security software 348 obtains a new encryption key as described above. However, if the security software 348 is unable to communicate with a suitable server, the method proceeds to block 470.

At block 470, the security software 348 determines whether the encryption key has expired. In this example, the security software 348 determines whether the expiration period for the encryption key has elapsed. As discussed above, the security software 348 maintains a refresh period and an expiration period for the encryption key. If the expiration period has not elapsed, the method returns to block 440; however, if the expiration period has elapsed, the method proceeds to block 472. In other examples, only one of many encryption keys may expire. For example, if the security software 348 maintains different encryption keys for multiple different users and only refreshes encryption keys for the active user, an encryption key for one user may be refreshed while the encryption keys for other users may expire.

At block 472, the security software 348 disables access to the secure partition 360. In this example, the expiration period indicates that the encryption key has been in use for too long and, because no new encryption key has been obtained, the security software 348 disables access to the secure partition 360. In this example, the security software 348 disables access to the secure partition 360 by disabling access to the encryption key until a new encryption key has been obtained, and by denying all application commands directed to the secure partition, except to close any open files. In some examples, the security software 348 may unmount the secure partition 360 to prevent access to it until a new encryption key has been obtained. Or, in some examples, if multiple users each have different encryption keys, one user's encryption key may expire, while another's remains refreshed. In one such example, the security software 348 disables access to any directories or files in the secure partition 360 associated with the expired key. Or, if a file is associated with multiple users, the security software 348 may allow one user to access the file while preventing access to the file, such as by disabling the user's access rules associated with the file. Access rules will be discussed in greater detail below with respect to FIG. 5.

After access to the secure partition 360 has been disabled, the method returns to block 460 to attempt to communicate with a key server.

While the example method 400 described above has been described as proceeding according to a particular sequence, in some aspects, the sequence of steps may occur in different orders, or multiple steps may occur simultaneously. Thus, no particular ordering of steps should be implied when reviewing FIG. 4 or the corresponding description of the example method 400 shown in FIG. 4.

Figure 5:
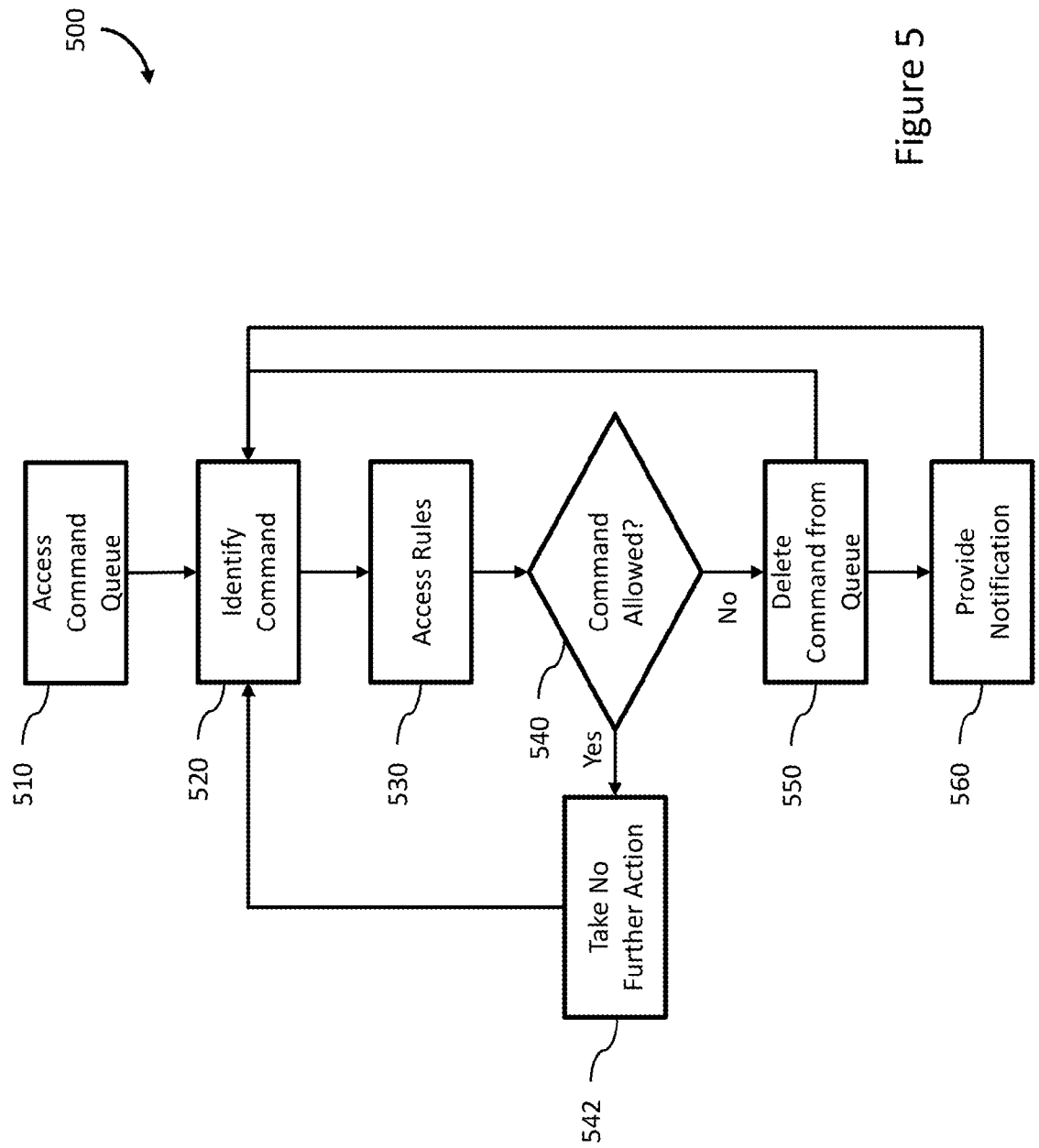

Referring now to FIG. 5, FIG. 5 shows an example method 500 for securing data on untrusted devices. The method 500 of FIG. 5 will be discussed with respect to the computing device 200 shown in FIG. 2 and the example system 300 shown in FIG. 3. However, example methods are not limited to such a computing device 200 or such an example system 300. Rather, any suitable device or system may be employed. In this example, the method 500 begins at block 510.

At block 510, the monitoring software 342 accesses the command queue 332. In this example, the computing device 200 executes an OS that enables multiple applications, executing as other processes (including single- or multi-threaded processes), to access API functions provided by the OS to perform various functions, such as displaying information, accessing files, and providing input to the computing device 200. When an application calls an API function, the API function generates a command and inserts the command into the OS's command queue for execution. Over time, the OS executes commands in the queue, and ultimately reaches the newly-inserted command and executes it.

In the example shown in FIG. 3, the monitoring software 342 accesses the command queue 332 and accesses commands in the queue 332. To access the command queue 332, the monitoring software 342 is executed as a process at a driver level of the OS such that it is provided sufficient access privileges to monitor the command queue 332. Typically, the command queue 332 is executed in a way that software applications executed by a user do not have sufficient privileges to access the command queue 332, though if special access privileges are not required in some examples, the monitoring software 342 may access the command queue 332 without extra privileges. In other aspects, the monitoring software 342 may not be specifically configured to operate with sufficient access privileges, but may be executed in a way that grants sufficient access privileges, such as by using a command like "sudo" to provide superuser privileges to the monitoring software 342. If the monitoring software 342 is unable to access the command queue 332, the monitoring software 342 may send a message or pass information to the security software 348, which may then disable access to the secure partition 360, such as by unmounting the secure partition, or causing all encryption keys to expire.

After the monitoring software 342 has accessed the command queue, the method 500 proceeds to block 520.

At block 520, the monitoring software 342 identifies a command in the command queue 332.

Figure 6:
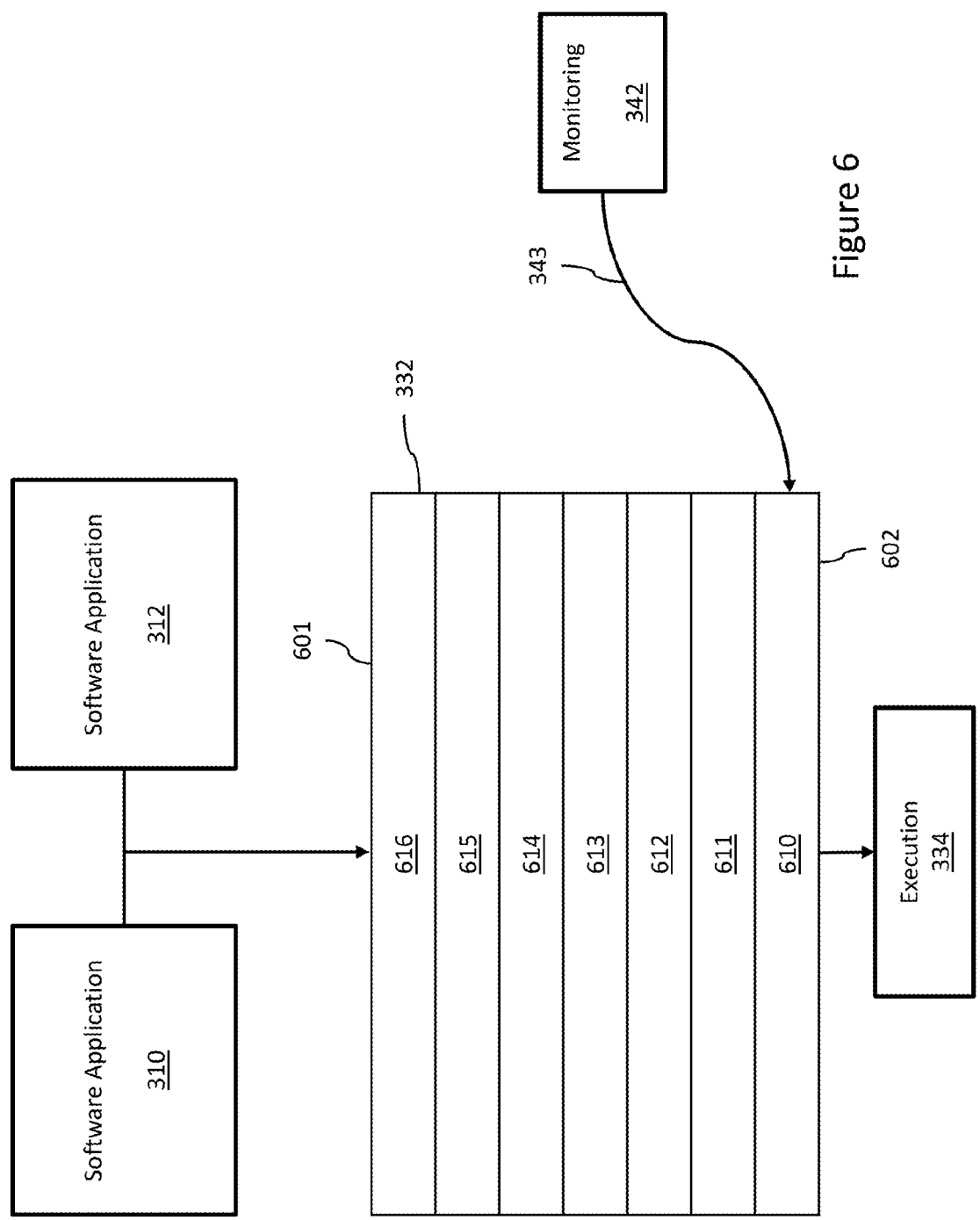
FIG. 6 shows an example system for securing data on untrusted devices.

Referring now to FIG. 6, which shows an example system for securing data in untrusted devices. In this example, the monitoring software 342 establishes a pointer 343 into the command queue 332 to indicate the position in the command queue 332 that the monitoring software 342 is accessing. In this example, because the command queue 332 is a queue, commands 610-616 are executed in the order in which they are inserted into the queue, from bottom 602 to top 601, and thus for a particular position of the pointer 343, the monitoring software 342 only accesses commands in a single direction towards the top 601 of the command queue 332 where new commands are added. In some aspects, a command queue may have different structures, or may comprise multiple command queues, for example to accommodate higher priority commands, e.g., commands issuing from interrupt handlers, or may not comprise a queue structure. In such aspects, access into the command structure may vary according to its architecture, but may be monitored accordingly.

When the monitoring software 342 is first launched, in this example, it sets the pointer 343 at the bottom of the command queue 332 and analyzes the command 610, if there is a command in the queue 332. In addition, when it is first launched, the monitoring software 342 establishes a data structure to track processes that attempt to perform commands on the secure partition 360. The data structure comprises zero or more records that enable the monitoring software 342 to determine whether a command in the command queue 332 should be allowed or not. To identify a command, the monitoring software 342 reads the command pointed to by the pointer 343 and identifies a process ID of the command. The monitoring software 342 then searches its data structure for the process ID. If the process ID is found, the command is identified, and the method 500 proceeds to block 530. In some aspects, however, the monitoring software 342 may also maintain records identifying process IDs that are exempt from monitoring, such as security software 348 or file sync software 346. If an exempt process ID is identified, the monitoring software 342 moves the pointer 343 to the next command, e.g., command 611, in the command queue 332. Further, in some examples, records within the data structure may include an indicator as to whether the record is associated with an exempt process ID. For example, the file sync software 346 may be exempt at certain times, but may be non-exempt at other times. For example, if the security software 348 determines that all encryption keys are expired, it may prevent file syncing by causing the monitoring software 342 to change the status of the file sync software 346 process ID to indicate it is non-exempt.

If the monitoring software 342 does not find a record in its data structure for the command's process ID, the monitoring software 342 searches the command for data associated with the secure partition 360, such as a path name. For example, if a path name including the secure partition is located within the command, the monitoring software 342 identifies the command and the method 500 proceeds to block 530. In addition, the monitoring software 342 generates a new record for its data structure and stores information associated with the command, such as the process ID and the path and file name of the accessed file. Thus, for future commands, the monitoring software 342 may find the record based on the process ID rather than searching for a path or file name.

In some aspects, commands in the command queue 332 may be associated with a process ID that is not directly associated with the secure partition, such as a screenshot command. Such a command may be issued by a process other than the process that is accessing data in the secure partition. For example, if a user attempts to take a screenshot of a word processing program screen that shows a portion of a document stored on the secure partition, the process ID of the screenshot functionality may be different than the process ID of the word processing program. However, in such a case, the command in the command queue 332 for the screenshot will typically include the process ID of the process with the active window of which the screenshot is being taken. Thus, the monitoring software 342 may also search commands in the command queue 332 for process IDs being referenced by another process ID. If the monitoring software 342 identifies that the screenshot process ID references the process ID for the word processing program, the monitoring software 342 may then identify the command.

In this example, the monitoring software 342 accesses the command queue 332 at a pre-defined rate, such as every millisecond, which can be configured according to user or administrator preferences. In some aspects, however, other rates may be used, or other triggers may be employed. For example, a launching of a new application may trigger the monitoring software 342 to access the command queue 332, or the monitoring software 342 may establish an event, such as an interrupt, that occurs every time a new command is input into the command queue 332 to check the command queue 332.

Figure 7:
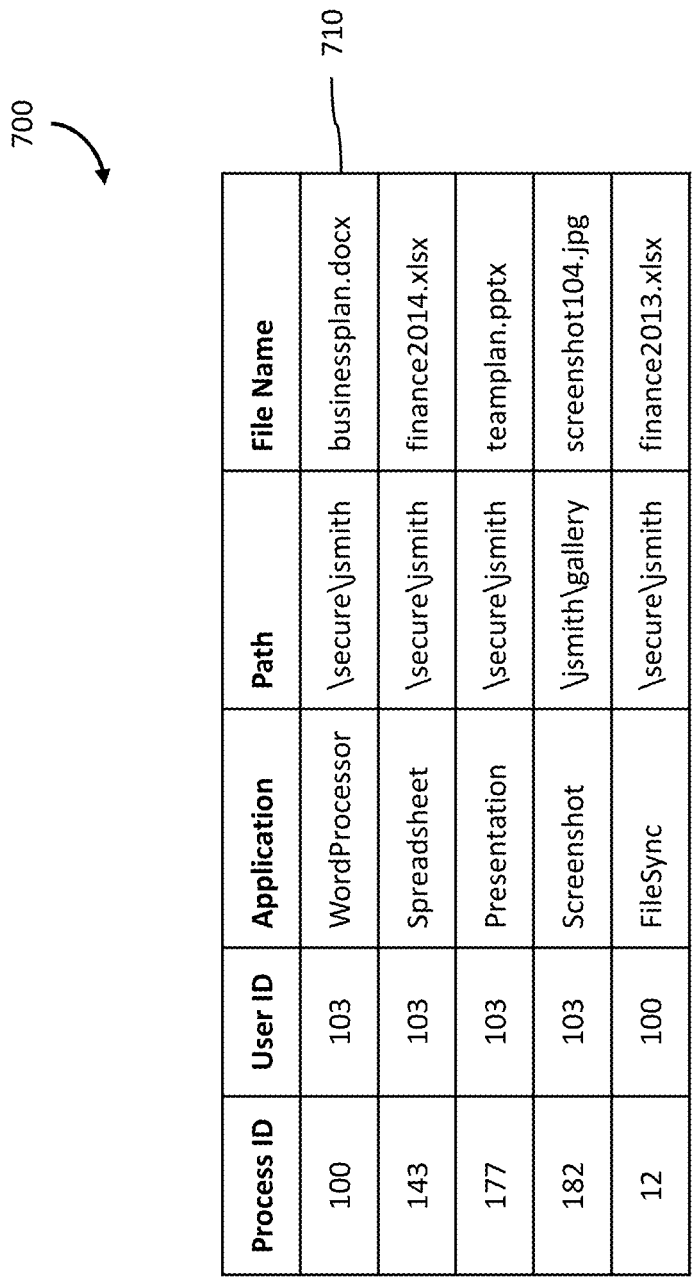
FIG. 7 shows an example data structure for tracking process IDs for securing data on untrusted devices.

Referring now to FIG. 7, FIG. 7 shows an example data structure 700 for tracking process IDs for securing data on untrusted devices. The data structure 700 is configured to store zero or more records 710 that may be used to identify commands in the command queue. In this example, each record includes fields for a process ID, a user ID, an application, a path, and a file name. The process ID is the process ID assigned to an instance of an executing software application by the OS. In some examples, the data structure may track thread IDs. The user ID is an identifier associated with the user who "owns" the process. In most OSes, even if only a single user is logged into a computing device, processes may be launched by different "users," such as by different services or by the OS itself, and thus may have different user IDs. In this example, user ID "103" corresponds to user "jsmith," while user ID "100" corresponds to the OS. The "application" field is the name of the application associated with the process ID. The "path" field is the path of a document being accessed by the corresponding process ID, and the "file name" field is the name of the document being accessed by the corresponding process ID. In this example, there are five processes that have been identified by the monitoring software 342, four have been launched by user ID "103" and one has been launched by the OS (having user ID "100"). Thus, when the monitoring software 342 analyzes a command in the command queue 332, it can check the data structure 700 to determine whether the command should be identified because it relates to the secure partition.

In this example, the data structure 700 is stored as an unsorted linked list of records, though in some examples, different types data structures may be used. For example, hash tables, relational databases, object databases, sorted lists, or other suitable data structures may be used.

If the monitoring software 342 does not find data associated with the secure partition, the monitoring software moves the pointer 343 to the next command in the command queue 332. The monitoring software then repeats the process again to determine whether the next command 611 should be identified.

After the monitoring software 342 identifies a command, the method 500 proceeds to block 530. It should be noted that the method 500 may proceed to block 530, but also substantially simultaneously perform the functions at block 520 with respect to the next command, e.g., command 611. For example, in some examples, the monitoring software 342 may create a new thread to perform the remaining steps 530, 540, 542, 550, 560 of the method, while the main thread of the monitoring software moves to the next command in the command queue.

At block 530, the monitoring software 342 accesses the access rules 344. In this example, the access rules 344 are stored in a data store, which may be a database, an in-memory data structure, or other suitable structure for maintaining the access rules 344. In this example, the monitoring software 342 first identifies a path and file name associated with the identified command. For example, as discussed above with respect to block 520, the monitoring software 342 maintains a data structure that tracks process IDs associated with the secure partition 360. The monitoring software 342 accesses and obtains a file name associated with the process ID and searches the access rules for one or more access rules associated with the file name. In one example, the access rules 344 are stored in a relational database, and the monitoring software 342 generates a search query language ("SQL") query for any records where the file name in the record matches the file name from the record in the monitoring software's data structure.

If multiple records are returned, the monitoring software 342 searches the returned records to identify any that are associated with the user ID associated with the identified command. For example, multiple users may have different access rules for the same file. Thus, the monitoring software 342 must identify the appropriate access rule for both the file and for the user. In some examples, there may be different access rules for different applications for the same user. In one such case, the monitoring software 342 may further refine the returned records to identify a record associated with the file, the user, and the application associated with the identified command. In some examples, other criteria may be employed to identify an access rule to apply.

In some examples, it may occur that multiple access rules are equally applicable to a command. In such one example, the monitoring software 342 uses the access rule with the most restrictive rule for the identified command. For example, if the identified command is a "print" command and two access rules are both applicable, but one prohibits printing while the other allows printing, the monitoring software 342 will compare the access rules for the identified command and, if the rules conflict, select the access rule that prohibits the command. However, in some examples, the monitoring software 342 may be able to determine a relative age of the multiple access rules and select the newest access rule, which may reflect a recent access rule change, or may represent an exception to a prior rule.

In some examples, an administrator, or other user, can configure how the monitoring software 342 handles conflicts between two or more access rules. For example, the administrator may establish conflict resolution rules based on the command to be performed. In one example, the administrator may configure the monitoring software 342 to resolve conflicts for commands "move," "copy," "paste," "rename," "save as," "save," and "email," to select the most restrictive access rule, while commands "open" and "print" may employ the least restrictive access rule. Such a conflict resolution scheme may allow a user to open and view a document, but not to edit it or otherwise move the file off of the secure partition, i.e., such a conflict resolution scheme may provide some read-only access to a file.

In some aspects, the access rules 344 may include default rules and user-specific rules. Thus, a search for rules for a command may always return two access rules, the default rule and the user-specific rule. In such a case, the monitoring software 342 may always use the user-specific rule, if it exists, and otherwise use the default rule. Alternatively, if an access rule for a file is not found, the monitoring software 342 may search for and apply a default rule, if one exists, or it may simply deny all commands if no access rule is found.

In some examples, the monitoring software 342 may not directly access the access rules, but instead, may transmit a message to another process, such as an access rules process, which determines whether the identified command is allowed. For example, the monitoring software 342 may identify a command and transmit a message comprising at least a portion of the command to a second process. The second process then, responsive to receiving the message, accesses the access rules data store to identify an access rule associated with the identified command.

After the monitoring software 342 has identified an access rule associated with the identified command, the method 500 proceeds to block 540.

At block 540, the monitoring software 342 determines whether the identified rule permits the identified command to be performed. To determine whether the command is permitted, the monitoring software 342 identifies a field in the identified rule having a permission associated with the identified command. For example, if the identified command is an "open" command, the monitoring software 342 identifies a field in the identified rule corresponding to a permission for an "open" command. In this example, fields having permissions have binary values—the command may be permitted or not permitted. However, in some examples, one or more fields may have different kinds of values. For example, a field may permit a particular operation a certain number of times, e.g., a user may be permitted to open a file a maximum of five times. In some examples, an access rule field may include a date or time such that the command may be performed prior to (or on) the date or time stored in the field, but is not permitted after the date or time. Still further variations may be possible as well.

In some examples, as discussed above, where the monitoring software 342 communicates with a second process to determine whether a command is allowed, the second process may generate and transmit a response to the monitoring software 342 indicating whether the command is allowed or not. For example, the second process may generate a response message that includes a value corresponding to the message received from the monitoring software, which may include the process ID of the identified command, and include a value indicating whether the command is allowed. The second process may then transmit the response message to the monitoring software 342.

If the monitoring software 342 determines that the identified command is allowed, the method proceeds to block 542.

At block 542, the monitoring software 342 takes no further action with respect to the identified command. In this example, the monitoring software 342 has determined the identified command is allowed based at least in part on the access rules, and therefore, allows the command to be executed by the OS. In some examples, the monitoring software 342 may generate an entry in an audit log 345 to indicate that the identified command was detected, that a corresponding rule was identified, and that the identified command was permitted. In some examples, such as one example discussed above, the monitoring software 342 may update an access rule, such as to decrement a value associated with the number of times a particular command may be performed on a document.

After any processing at block 542 has completed, the method 500 returns to block 520 where the monitoring software identifies the next command.

If, at block 540, the monitoring software 342 determines that the identified command is not allowed, the method 500 proceeds to block 550.

At block 550, the monitoring software 342 deletes the identified command from the command queue 332. In this example, the command queue 332 is provided using a circular buffer in which commands are inserted. The circular includes a pointer for the head of the queue and for the tail of the queue such that new commands are added at the tail of the queue, and commands to be executed are taken from the head of the queue. When a new command is added to the queue, the tail pointer is incremented, and if the end of the buffer is reached, set to point to the start of the buffer. Similarly, when a command is executed, the head pointer is incremented, and like the tail pointer, if the end of the buffer is reached, set to point to the start of the buffer.

To delete a command from a circular buffer, the monitoring software 342 may substitute a "no operation" or similar entry into the command queue such that when the OS reaches the entry in the circular buffer no operation is performed, or the monitoring software 342 may change a value in the identified command to indicate that the command has been executed such that it will not be executed when the head pointer reaches it. If the identified command is in a location adjacent to the location of the tail pointer, the monitoring software 342 may simply move the tail pointer such that the next command inserted into the command queue overwrites the disallowed command. In some examples, the monitoring software 342 may both overwrite the command with a "no operation" or similar command and move the tail pointer such that the next command overwrites the "no operation" command. Such an aspect may eliminate a potential race condition in the event the head pointer reaches the tail pointer before a new command overwrites the disallowed command. In some examples, if the disallowed command is immediately adjacent to the head pointer, the monitoring software 342 may adjust the head pointer to skip over the disallowed command.

In some examples, the command queue 332 may use a different data structure, such as a linked list or a doubly-linked list. In one such example, the monitoring software 342 may delete a node in the list and modify pointers in the two list node data structures adjacent to the deleted node such that those two list node data structures point to each other, thereby bypassing the deleted node. In some examples, the command queue 332 may be stored in a different type of data structure and a suitable deletion strategy may be employed in such examples.

In addition to deleting the identified command from the command queue 332, the monitoring software 342 may also add an entry to the audit log 345. For example, the monitoring software 342 may add an entry having a time and date stamp, a user name, a file name, the identified command, and the application name.

In some examples, after the monitoring software 342 deletes the identified command from the command queue 332, the method 500 returns to block 520 to analyze additional commands. In some examples, as discussed above, the monitoring software 342 may launch a thread to determine whether the identified command should be allowed or not. In one such example, after deleting the identified command from the command queue 332, the thread may terminate. In some examples, the method may proceed to block 560.

At block 560, the monitoring software 342 provides a notification to the user that the attempted command was disallowed. When the monitoring software 342 deletes an identified command from the command queue 332, unless a notification is provided to the user, the command is simply not executed, and the user may not realize that it is not due to a bug or some other error. Thus, in some examples, a notification may be provided to the user. For example, the monitoring software 342 may generate and display a dialog box indicating the disallowed command as well as a message indicating that the user is not authorized to perform the command. In some examples, audible, visual, tactile, or other notifications may be provided to the user to indicate that the command was disallowed and did not execute.

After the monitoring software 342 provides the notification, the method 500 returns to block 520 to identify the next command. In some examples, as discussed above, the monitoring software 342 may launch a thread to determine whether the identified command should be allowed or not. In one such example, after providing a notification to the user, the thread may terminate.

In some examples, the method 500 of FIG. 5 may be performed in parallel with, or in conjunction with, the example method 400 of FIG. 4. The example method 400 of FIG. 4, as described above, may provide access to a secure partition 360, while the method 500 of FIG. 5 may regulate commands executed on different files within the secure partition 360. However, the example method 500 of FIG. 5 may be performed independently of FIG. 4, and performance of the example method 400 of FIG. 4 is not required. Further, the example method 400 of FIG. 4 may be performed without performing the example method of FIG. 5. However, performing both methods 400, 500 may provide enhanced benefits for securing data on untrusted devices.

While the methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory ("RAM") coupled to the processor. The processor executes computer-executable program instructions stored in memory, such as executing one or more computer programs for editing an image. Such processors may comprise a microprocessor, a digital signal processor ("DSP"), an application-specific integrated circuit ("ASIC"), field programmable gate arrays ("FPGAs"), and state machines. Such processors may further comprise programmable electronic devices such as programmable logic controllers ("PLCs"), programmable interrupt controllers ("PICs"), programmable logic devices ("PLDs"), programmable read-only memories ("PROMs"), electronically programmable read-only memories ("EPROMs" or "EEPROMs"), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

That which is claimed is:

1. A method comprising:
monitoring, by a first process executing on an operating system on a computing device, commands in an operating system command queue of the operating system,
identifying, by the first process without stopping the operating system command queue, a command from a second process based on the monitoring, the command indicating an action on secure data, the identifying before the operating system obtains the command from the operating system command queue for execution, the second process executing on the operating system on the computing device, wherein identifying the command comprises:
  identifying an entry in the operating system command queue associated with a secure storage location,
  identifying a path on a computer-readable medium for the secure storage location or a process identifier of a software application accessing the secure data; and
  identifying the software application based on the entry;
while the command remains in the operating system command queue, determining whether the command is permitted based on the action and a user credential, wherein the determining comprises:
  accessing an access rules data store comprising one or more rules associated with commands or user credentials;
  determining whether the command is permitted based on the command and the one or more rules; and
  providing an indication of whether the command is permitted or not; and
responsive to the indication that the command is not permitted, removing, by the first process, the command from the operating system command queue before the operating system obtains the command from the operating system command queue for execution, the removing preventing the operating system from executing the command.

2. The method of claim 1, wherein the secure storage location comprises a separately-mountable partition of a computer-readable medium.

3. The method of claim 1, wherein the secure data comprises data stored within a secure storage location, and wherein identifying the command comprises identifying an entry in the operating system command queue associated with a process identifier of a process accessing the secure data.

4. The method of claim 1, further comprising, responsive to determining the command is permitted, not removing the command from the operating system command queue.

5. The method of claim 1, wherein the command comprises at least one of a save command, a "save as" command, an open command, a move command, a rename command, a print command, a copy command, a cut command, a paste command, an email command, a screenshot command, a rename command, or a share command.

6. The method of claim 1, wherein determining whether the command is permitted based on the action and a user credential further comprises
   determining a process identifier (process ID) of the second process;
   determining a process ID of a third process based on the command, the process ID of the second process associated with the process ID of the third process; and
   determining whether the command is permitted based on the command, the association between the process ID of the second process and the process ID of the third process, and the one or more rules.

7. A device comprising:
   a non-transitory computer-readable medium;
   an operating system;
   a processor in communication with the non-transitory computer readable medium, the processor configured to:
      execute the operating system;
      monitor, by a first process executed by the processor on the operating system, an operating system command queue to identify commands from other processes executed by the processor on the operating system, at least one of the commands indicating an action on secure data;
      identify, by the first process without stopping the command queue, a command from a second process based on the monitoring, the command indicating an action on secure data, the identifying before the operating system obtains the command from the operating system command queue for execution, the second process executed by the processor on the operating system, wherein the processor is configured to, to identify the operating system command queue:
         identify an entry in the operating system command queue associated with a secure storage location,
         identify a path on a computer-readable medium for the secure storage location or a process identifier of a software application accessing the secure data; and
         identify the software application based on the entry,
      access an access rules data store comprising one or more access rules to determine whether the at least one command is permitted, the one or more access rules associated with commands or user credentials;
      while the command remains in the operating system command queue, determine whether the command is permitted based on the command and the one or more access rules;
      provide an indication of whether the command is permitted or not; and
      responsive to the indication that the command is not permitted, remove the command from the operating system command queue before the operating system obtains the command from the operating system command queue for execution, the removing preventing the operating system from executing the command.

8. The device of claim 7, wherein the secure storage location comprises a separately-mountable partition of a computer-readable medium.

9. The device of claim 7, wherein the secure data comprises data stored within a secure storage location, and wherein the processor is further configured to identify an entry in the operating system command queue associated with a process identifier of a process accessing the secure data to identify the command.

10. The device of claim 7, wherein the processor is further configured to not remove the command from the operating system command queue if the command is permitted.

11. The device of claim 7, wherein the command comprises at least one of a save command, a "save as" command, an open command, a move command, a rename command, a print command, a copy command, a cut command, a paste command, an email command, a screenshot command, a rename command, or a share command.

12. A non-transitory computer-readable medium comprising program code, the program code comprising monitoring software and access rules software executable by a processor, the monitoring software configured to:
   monitor, by a first process executing on an operating system on a computing device an operating system command queue to identify commands from other processes executed by the processor on the operating system;
   identify, by the first process without stopping the operating system command queue, a command from a second process based on the monitoring, the command-indicating an action on secure data, the identifying before the operating system obtains the command from the operating system command queue for execution, the second process executed by the computing device on the operating system, the monitoring software configured to, to identify the command:
      identify an entry in the operating system command queue associated with a secure storage location,
      identify a path on a computer-readable medium for the secure storage location or a process identifier of a software application accessing the secure data; and
      identify the software application based on the entry;
   while the command remains in the operating system command queue,
   transmit a request to determine whether the command is permitted; and
   responsive to a response to the request indicating that the command is not permitted, remove the command from the operating system command queue before the operating system obtains the command from the operating system command queue for execution, the removing preventing the operating system from executing the command; and
the access rules software configured to:
   access an access rules data store, the access rules data store configured to store one or more rules associated with commands or user credentials;
   receive requests to determine whether commands associated with the requests are permitted;
   determine whether the commands are permitted based on the respective request and the one or more rules; and
   transmit a response message to the respective request.

13. The non-transitory computer-readable medium of claim 12, wherein the secure storage location comprises a separately-mountable partition of a computer-readable medium.

14. The non-transitory computer-readable medium of claim 12, wherein the secure data comprises data stored within a secure storage location, and wherein the monitoring software is further configured to identify an entry in the operating system command queue associated with a process identifier of a process accessing the secure data to identify the command.

15. The non-transitory computer-readable medium of claim 12, wherein the monitoring software is further configured to, responsive to a determination that the command is permitted, not remove the command from the operating system command queue.

16. The non-transitory computer-readable medium of claim 12, wherein the command comprises at least one of a save command, a "save as" command, an open command, a move command, a rename command, a print command, a copy command, a cut command, a paste command, an email command, a screenshot command, a rename command, or a share command.

\* \* \* \* \*